United States Patent
Staley et al.

(10) Patent No.: US 8,332,646 B1
(45) Date of Patent: Dec. 11, 2012

(54) ON-DEMAND WATERMARKING OF CONTENT

(75) Inventors: Clinton A Staley, Atascadero, CA (US); Darren Giles, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 1085 days.

(21) Appl. No.: 11/297,644

(22) Filed: Dec. 8, 2005

Related U.S. Application Data

(60) Provisional application No. 60/635,343, filed on Dec. 10, 2004.

(51) Int. Cl.
 *H04L 9/32* (2006.01)
(52) U.S. Cl. .................... 713/176; 380/201
(58) Field of Classification Search .............. 713/176, 713/177, 716, 179, 193, 194; 726/27–33, 726/7; 715/805, 804, 781; 380/210, 287, 380/201; 382/100, 291, 293; 705/50–80
See application file for complete search history.

(56) References Cited

U.S. PATENT DOCUMENTS

| | | | | |
|---|---|---|---|---|
| 4,998,171 | A * | 3/1991 | Kim et al. | 348/565 |
| 5,999,175 | A * | 12/1999 | Nalder | 715/766 |
| 6,208,745 | B1 * | 3/2001 | Florencio et al. | 382/100 |
| 6,643,719 | B1 * | 11/2003 | Baker | 710/57 |
| 7,526,733 | B1 * | 4/2009 | Samson | 715/805 |
| 2001/0037465 | A1 * | 11/2001 | Hart et al. | 713/201 |
| 2002/0094082 | A1 * | 7/2002 | Jones et al. | 380/219 |
| 2002/0141578 | A1 * | 10/2002 | Ripley et al. | 380/201 |
| 2002/0163481 | A1 * | 11/2002 | Takamine | 345/1.1 |
| 2002/0181735 | A1 * | 12/2002 | Rhoads et al. | 382/100 |
| 2004/0021549 | A1 * | 2/2004 | Choi et al. | 340/5.8 |
| 2004/0059918 | A1 * | 3/2004 | Xu | 713/176 |
| 2004/0117629 | A1 * | 6/2004 | Koto et al. | 713/176 |
| 2004/0151313 | A1 * | 8/2004 | Weirauch | 380/203 |
| 2005/0001419 | A1 * | 1/2005 | Levy et al. | 281/2 |
| 2005/0002526 | A1 * | 1/2005 | Choi et al. | 380/236 |
| 2005/0021970 | A1 * | 1/2005 | Reese et al. | 713/176 |
| 2005/0068582 | A1 * | 3/2005 | Ferlitsch | 358/1.18 |
| 2005/0123169 | A1 * | 6/2005 | Wendt | 382/100 |
| 2005/0193205 | A1 * | 9/2005 | Jacobs et al. | 713/176 |
| 2005/0254782 | A1 * | 11/2005 | Hsu | 386/52 |
| 2005/0259289 | A1 * | 11/2005 | Ferlitsch et al. | 358/1.14 |
| 2006/0184980 | A1 * | 8/2006 | Cole | 725/88 |

OTHER PUBLICATIONS

Jian Zhao, Apply Digital Watermarking Technigues to onlin multimedia commerce, Jul. 3, 1997.*

* cited by examiner

*Primary Examiner* — Eleni Shiferaw
*Assistant Examiner* — Abu Sholeman
(74) *Attorney, Agent, or Firm* — Lee & Hayes, PLLC

(57) ABSTRACT

On-demand watermarking of digital content, particularly in the context of retail transactions, is described. Rather than replicating the digital content in bulk or mass at once, the digital content is replicated on-demand, at the time that a customer orders or otherwise transacts for the content. After the order is placed, the digital content is watermarked. The watermark can be defined based on personal information related to the customer, thereby personalizing or customizing the watermark and the digital content.

24 Claims, 15 Drawing Sheets

ON-DEMAND WATERMARKING OF CONTENT

RELATED ART

CROSS-REFERENCE TO RELATED APPLICATIONS

This application claims the benefit of the filing date of U.S. Provisional Patent Application No. 60/635,343, filed on 10 Dec. 2004, entitled "Watermarking Methods for On-Demand DVD Duplication", to the fullest extent permitted by 35 U.S.C. §119(e). The subject matter recited in the foregoing provisional application is incorporated by this reference as if set forth verbatim herein.

TECHNICAL FIELD

This invention relates to on-demand media production, and particularly, to on-demand watermarking of content encoded onto media.

BACKGROUND

An ongoing concern in the area of digital rights management is the unauthorized copying of content that is released into the marketplace. Numerous schemes and techniques have been introduced to discourage and/or prevent such unauthorized copying, with varying degrees of success.

Taking Digital Video Discs (DVDs) as an example of such content, DVDs can be protected from illegal or unauthorized copying by at least two techniques: Macrovision and CSS. Both of these techniques attempt to make it difficult or impossible to make a usable copy of a DVD. However, both of these techniques can be bypassed with readily available and inexpensive tools. Additionally, neither technique is supported on DVD-R media.

The use of watermarks to discourage copying is a stronger approach, but current systems do not enable watermarking in the context of retail sales. This is due to at least two reasons. First, retail sales typically involve media that have been previously replicated in mass. Therefore, these mass-produced media cannot contain watermarks that are individualized for particular purchasers, because the identity of the purchaser is not known when the DVD is replicated. Second, limitations of current watermark techniques may not fully lend themselves to the retail context.

SUMMARY

On-demand watermarking of digital content, particularly in the context of retail transactions, is described. Rather than replicating the digital content in bulk or mass at once, the digital content is replicated on-demand, at the time that a customer orders or otherwise transacts for the content. After the order is placed, the digital content is watermarked. The watermark can be defined based on personal information related to the customer, thereby personalizing or customizing the watermark and the digital content.

BRIEF DESCRIPTION OF THE DRAWINGS

The same numbers are used throughout the disclosure and figures to reference like components and features. The first digit of a reference number indicates the drawing figure in which that reference number is introduced.

DETAILED DESCRIPTION

Overview

The following document describes system(s) and/or method(s) ("tools") capable of many techniques and processes. The following discussion describes exemplary ways in which the tools enable on-demand watermarking of content. This discussion also describes ways in which the tools perform other techniques as well.

Before describing the tools in detail, the following discussion of an exemplary operating environment is provided to assist the reader in understanding one way in which various aspects of the tools may be employed. The environment described below constitutes but one example and is not intended to limit application of the tools to any one particular operating environment. Other environments may be used without departing from the spirit and scope of the claimed subject matter.

Figure 1:
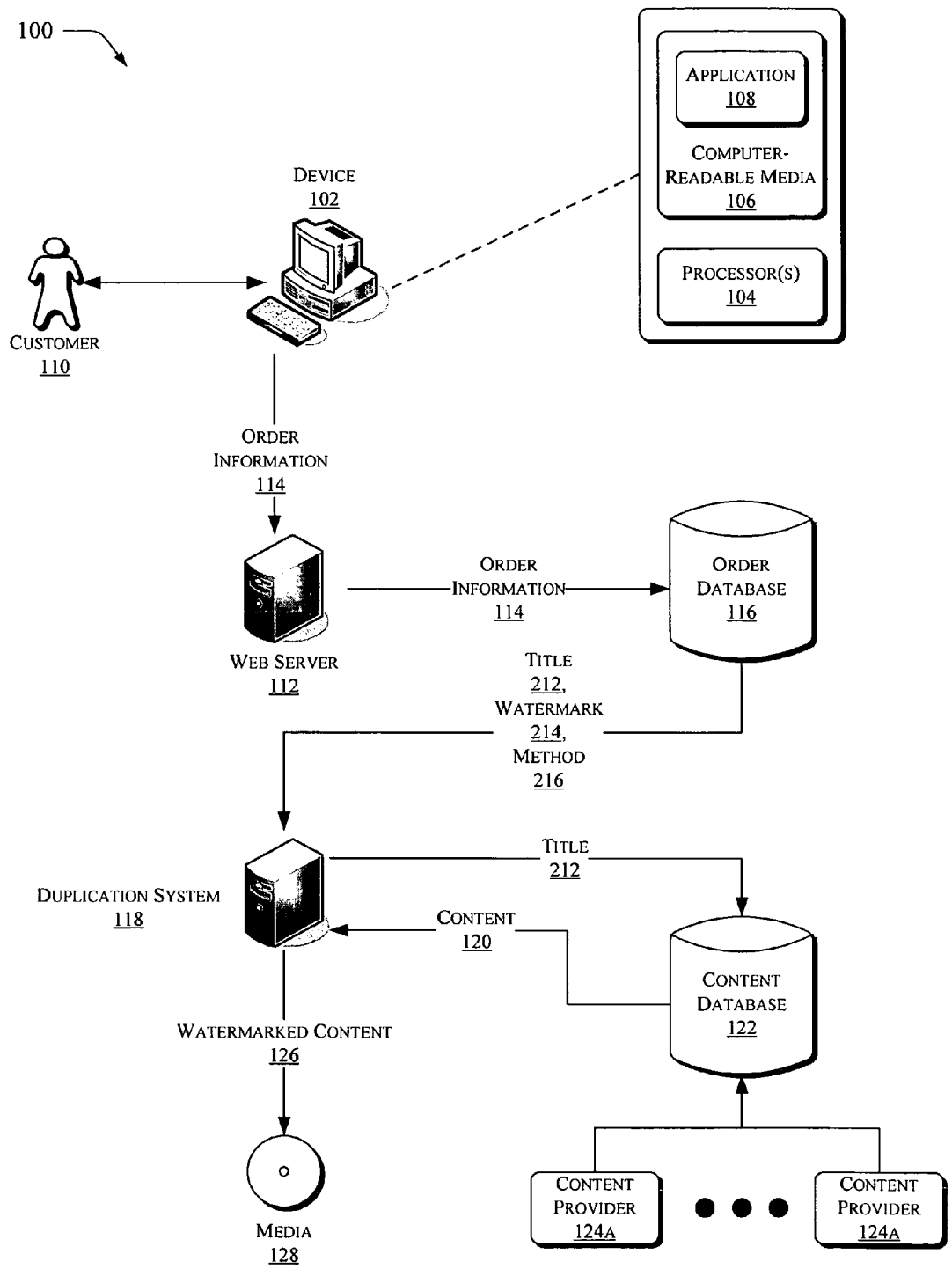
FIG. 1 is a combined block diagram and data flow diagram of an operating environment and related data flows for performing on-demand watermarking of content.

FIG. 1 illustrates one such operating environment for performing on-demand watermarking of content, generally at 100. The operating environment 100 includes a device 102 having one or more processor(s) 104 and computer-readable media 106. The device 102 may be implemented as a computing device, which is embodied in a number of ways, such as a cell phone, workstation, desktop computer, personal digital assistant, server, or the like. The processor 104 can be configured to access and/or execute the computer-readable media 106. The computer-readable media 106 can include or have access to an application 108, which may be implemented as a module, program, or other entity capable of interacting with a network-enabled entity. The application 108 may take the form of a web browser, with suitable web browsers being available from a variety of vendors or sources. It is understood that the applications 108 may take forms other than the specific examples given above.

A customer 110 may interact with the application 108 to access, for example, a website that is hosted by a web server 112, and that is accessible to a plurality of similar customers 110 over a network (not shown), such as the Internet. For example, the website can be a retail website that offers content or media to the customers 110. It is understood that the customer 110 need not obtain outright ownership or title to the ordered content or media. Instead, the customer 110 may obtain a license as to certain rights in the ordered content or media. This license may thus make the customer 110 a licensed or authorized viewer of the content or media.

The web server 112 is operative to exchange data with the application 108 so as to enable the customers 110 to place orders for content encoded onto media offered by the website. A non-limiting example of such media can be Digital Video Disks (DVDs). Information provided by the customers 110 related to such orders is represented generally as order information 114 in FIG. 1. The web server 112 stores the order information 114 into, for example, an order database 116. Illustrative contents of the order database 116 are now described in connection with FIG. 2, before returning to continue the description of FIG. 1.

Figure 2:
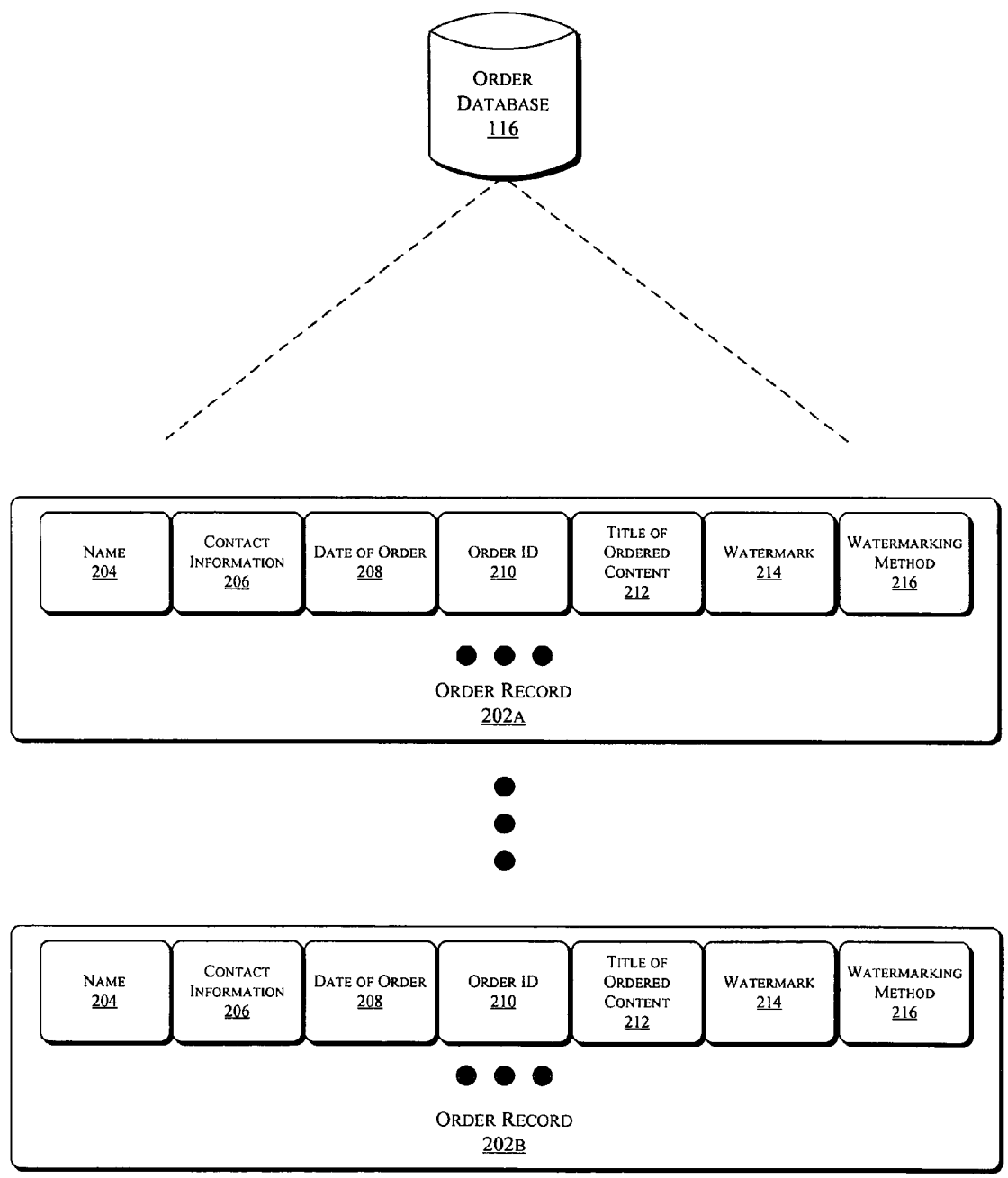
FIG. 2 is a block diagram of exemplary data and related fields that may be stored in an order database, as shown in FIG. 1.

FIG. 2 illustrates exemplary data and related fields that may be stored in the order database 116 as shown in FIG. 1. The order database 116 contains a respective order record 202 for each order placed by the customers 110. For convenience, FIG. 2 depicts two order records 202a and 202b of the many order records to be stored in the order database 116. Depending upon implementation details, the order database 116 could contain any number of order records 202.

Instances of the order records 202 contain a number of different fields. For example, a name field 204 contains data representing a name of a customer 110. A contact field 206 contains data representing contact information for the customer 110, such as mailing address, e-mail address, home or business address, or the like. A date of order field 208 contains data representing a date on which the customer 110 placed the order represented in the given particular order record 202. An order ID field 210 contains data representing a key, index, or other data element that uniquely identifies the given order record 202 from all other order records 202. A title field 212 contains data representing a title of the content ordered by the customer 110.

Also included in individual order records 202 is a watermark field 214, which contains data representing one or more watermarks to be applied to the ordered content when the customer's order is fulfilled, as discussed in further detail below. The watermark field 214 contains the binary data used to watermark the ordered digital content. This field 214 may be populated with the contents of other fields within the order record 202, such as the ID field 210. In some implementations, the watermark field 214 may be populated with the contents of the name field 204, in cases where the watermark is to display the name of the customer 110 prominently. In other implementations, the contents of fields within the order record 202 may be transformed into a watermark, for example, by using a suitable hash function. In any event, the field 214 serves to associate a given watermark with a given customer 110 and/or a given order 210. In this manner, the field 214 can enable forensically tracing a given watermark back to a customer 110 and/or order 210.

The order records 202 may also contain a watermarking method field 216, which contains data representing how the watermark contained in field 214 is to be embedded in the digital content. In some implementations, the customer 110 may be given a choice of different watermarking methods that may be available for a given title of the media or content. In such implementations, field 216 can contain the watermarking method chosen by the customer 110.

In other implementations, the watermarking method may be specified by default for a given title of the content. For example, the provider of the content being ordered by the customer 110 may dictate how its content is to be watermarked. The content provider may specify, on a per-title basis, the applicable watermarking method. Thus, the watermark method field 216 may be populated automatically from pre-existing data (e.g., the content provider's specification), once the customer 110 orders a given title of the content. Where the content provider does not specify a watermarking method, the web server 112 may do so. In some instances, the content may not be watermarked at all, whether by customer choice or by default. In these cases, the watermark method field 216 may be empty, or may be populated with a predefined value that indicates that no watermarking is performed.

It is understood that implementations of the order database 116 may contain records other than the order records 202, or may contain order records 202 that contain fields in addition to the fields 204-216 described above without departing from the scope and spirit of the subject matter described herein. It is also understood that implementations of the order records 202 may contain one, some, or all of the fields 204-216 described above. Thus, the layout, format, arrangement, and names of the order records 202 and related fields 204-216 are understood to be illustrative and non-limiting.

Returning to FIG. 1, at least some of the order information 114 can be extracted from the order database 116 and passed to a duplication system 118. Generally, the duplication system 118 is operative to fulfill orders placed by the customers 110, for example, by processing the order records 202 in turn as they are stored in the order database 116. Thus, at least some data elements as stored in the order records 202 are passed to the duplication system 118 to fulfill the customer orders. For conciseness and convenience, but not limitation, FIG. 1 shows this data flow as including the title of the content ordered by the customer 110, the watermark to be embedded in the ordered content, and the method to be used in embedding the watermark in the ordered content. Recall from FIG. 2 that these data elements are contained in fields 212, 214, and 216, respectively.

Using the title of the ordered content as a key or index, the duplication system 118 obtains at least content 120 for this title from a content database 122. Respective entries in the content database 122 may be provided by, for example, content providers 124 who provide the various titles of the media or content offered for order by the customer 110. Two content providers 124a and 124b are shown in FIG. 1 for convenience. However, the operating environment 100 can support any number of content providers 124. Illustrative contents of the content database 122 are now described in connection with FIG. 3, before returning to continue the description of FIG. 1.

Figure 3:
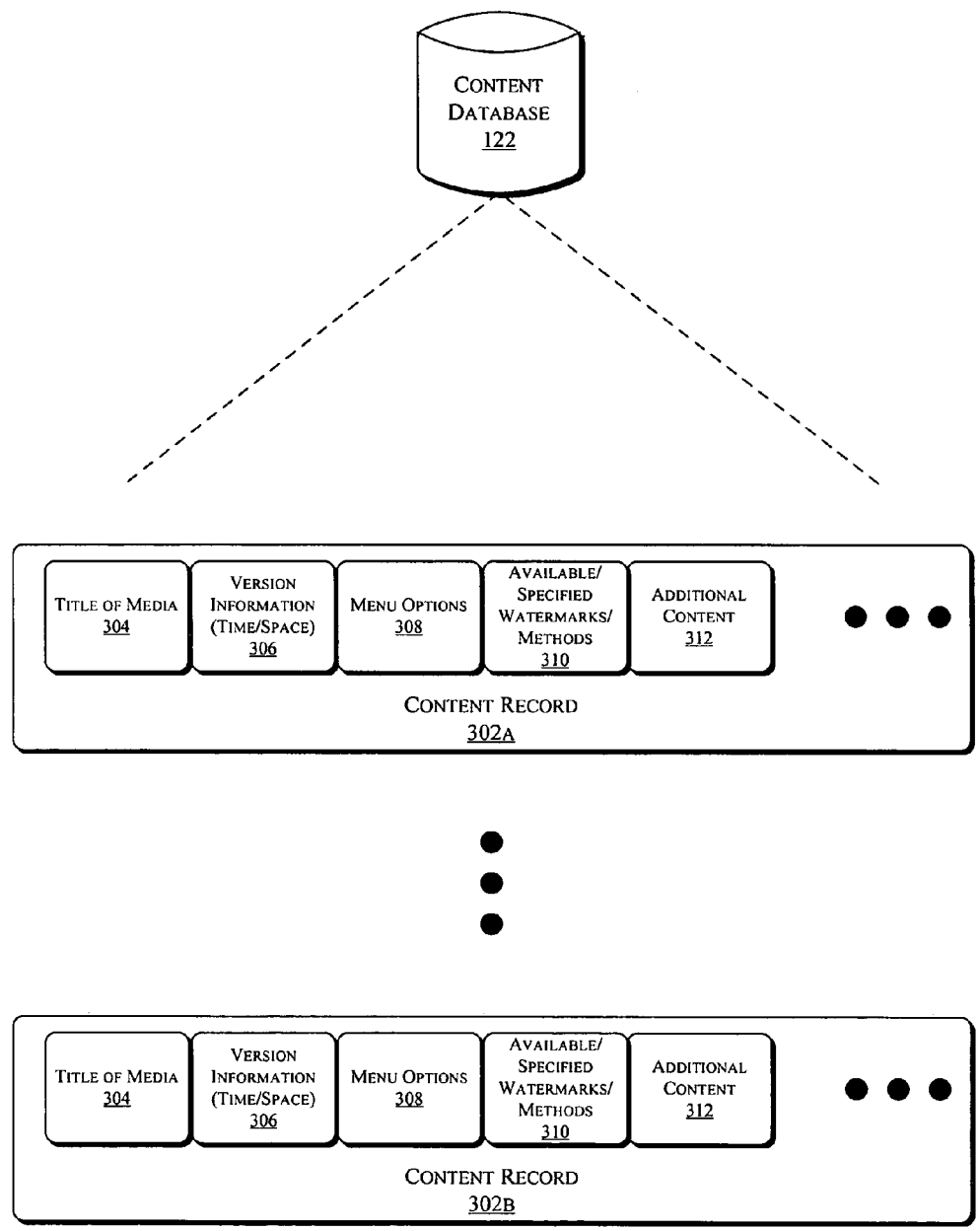
FIG. 3 is a block diagram of exemplary data and related fields that may be stored in a content database, as shown in FIG. 1.

FIG. 3 illustrates exemplary data and related fields that may be stored in the content database 122 as shown in FIG. 1. The content database 122 can contain a respective content record 302 for each instance or title of the content made available to the customers 110 via the web server 112. For convenience, FIG. 3 depicts two content records 302a and 302b, but implementations of the content database 122 could contain any number of content records 302.

Instances of the content records 302 can contain a number of different fields. For example, a title field 304 contains data representing a title of a given instance of content. The title field 304 may serve as an index or key field for the content database 122 and/or the content records 302.

A version information field 306 contains data representing alternative versions of various scenes contained within the given content. More particularly, field 306 can contain data representing different versions or alternatives available for these different scenes. Assuming that these versions are organized along a time axis, a temporal watermark can be embedded in the ordered content by selecting from among these different versions available at different points along the time axis. Assuming that these versions are jittered along one or more spatial axes, a spatial watermark can be embedded by selecting from among these different versions that are available along these spatial axes. In any event, the selected versions can then be composited to form, at least in part, the ordered content provided to the customer 110.

A menu options field 308 contains data representing the menu options available when playing or viewing the given content. As discussed in further detail below, the ordered content can be watermarked by varying parameters relating to the menu options. In some implementations, the menu options field 308 may be integrated into the version information field 306. Field 308 is shown as a separate block to facilitate description only.

A field 310 contains data representing one or more watermarks and/or watermarking methods that are available to be applied to the given content when the customer's order is fulfilled. Recall from FIG. 2 that, in some implementations, the customer 110 may be given a choice of different watermarks and/or watermarking methods for a given title of the content. These available watermarks and/or watermarking methods may be specified in the field 310, such that the web server 112 may refer to the field 310, or to similar data stored elsewhere, when taking an order from the customer 110.

Recall also from FIG. 2 that, in other implementations, the content provider 124 may specify by default the watermark and/or watermarking method to be applied to a given title of the content. Thus, the field 310 in the content record 302 may specify the watermark and/or watermarking method to be applied to the given title of the content, regardless of customer input. Also, in some instances, the content may not be watermarked at all, whether by customer choice or by default for a particular title. In these cases, the field 310 may so indicate. In some implementations, the content provider 124 may indicate, through field 310, whether a prominent watermark, such as "Property of John Smith", is to be embedded, or whether a sub-cognitive watermark is to be embedded. In such implementations, the content provider may leave the actual choice of watermarking method to the web server 112 and/or the duplication system 118.

The content records 302 can also contain respective additional content fields 312 for the title represented by each given content record 302. The additional content field 312 can contain any subject matter beyond that contained in, for example, the fields 306 and 308, that is appropriate to composite a complete instance of the digital content 120 ordered by the customer 110. In other words, the composited content 120 represents what the customer 110 wishes to access or view when he or she orders the title. In other implementations, the content record 302 may include a content location field that provides a pointer or link to where the content is stored.

It is understood that implementations of the content database 122 may contain records other than the content records 302, or may contain content records 302 that contain fields in addition to the fields 304-312 described above without departing from the scope and spirit of the subject matter described herein. It is also understood that implementations of the content records 302 may contain one, some, or all of the fields 304-312 described above. Thus, the layout, format, arrangement, and names of the content records 302 and related fields 304-312 are understood to be illustrative and non-limiting.

The tools described and illustrated herein may utilize data structures as part of their implementation and/or operations to perform on-demand watermarking of media. Examples of such data structures were described above in FIGS. 2 and 3, in connection with the order database 116 and the content database 122. However, in the interest of conciseness, that description is not repeated here. However, it is noted that the order database 116 and the content database 122 are shown separated in FIGS. 1-3 only for convenience of illustration and discussion. In other implementations, the order database 116 and the content database 122 and the contents thereof can be integrated into one common data store without departing from the scope and spirit of the subject matter described herein.

Returning to FIG. 1, the duplication system 118 receives at least the content 120 from the content database 122. In addition, the duplication system 118 receives any data appropriate for determining what watermark, if any, to embed into the ordered content, as well as the method for embedding the watermarks.

Recall from FIG. 2 that the watermark and/or watermarking method can be specified by the customer 110 and stored in field 214 of the order database 116. In this case, the duplication system 118 can receive or extract from the order database 116 at least the contents of the fields 212, 214, and 216.

Recall also that the watermark and/or watermarking method can be specified by the content providers 124. In this case, the duplication system 118 can also extract or receive at least the field 310 from the content record 302 of the content database 122.

In any event, the duplication system 118 is operative to embed any watermark, whether user-selected, provider-specified, or system-specified, onto the content 120 retrieved from the content database 122, and to copy the watermarked content 126 onto an instance of media 128. The media 128 can take any convenient intangible or tangible form, including, for example, the form of CD-ROMs or DVDs. In this manner, a watermark is defined based on personal information or order information related to the customer 110, and is embedded in to the content 126 after the content 126 is ordered by the customer 110. Thus, while a content provider 124 may specify the watermarking method, the actual watermark used to watermark the content 126 is mapped to a specific order or customer 110, via, for example, the fields 214, 210, and 204 appearing in the order database 116.

Having described the overall operating environment 100 in FIG. 1, the discussion now turns to a more detailed description of the webserver 112 and the duplication system 118.

Figure 4:
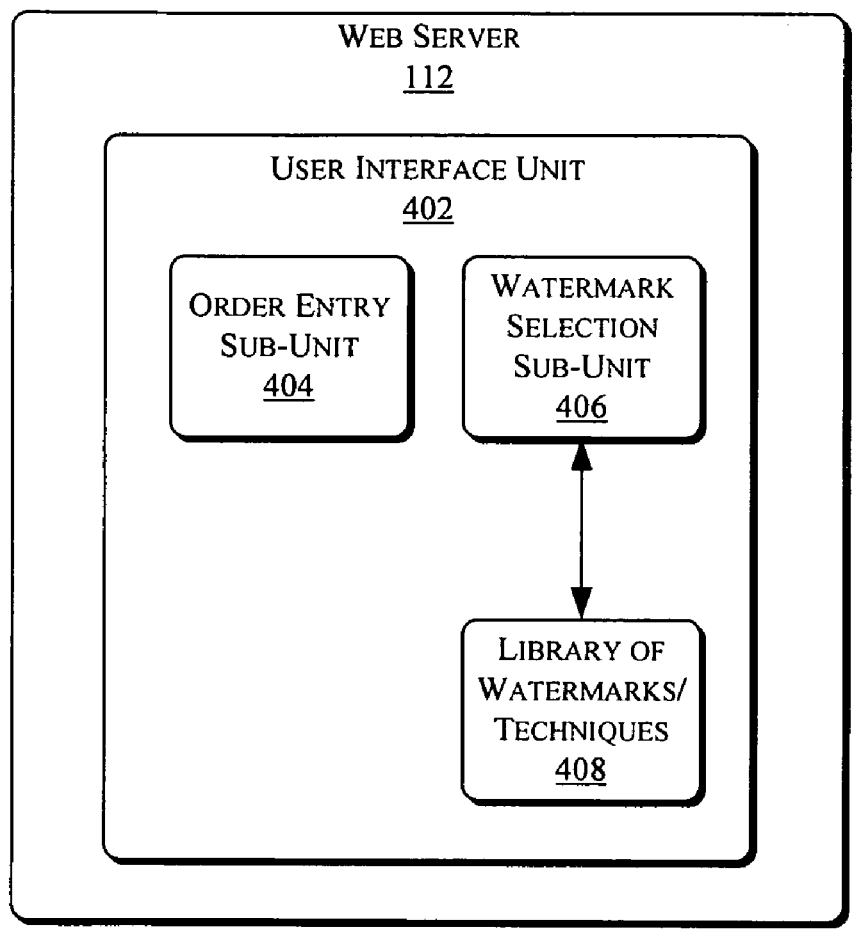
FIG. 4 is a block diagram of further architectural details related to a webserver as shown in FIG. 1.
Figure 5:
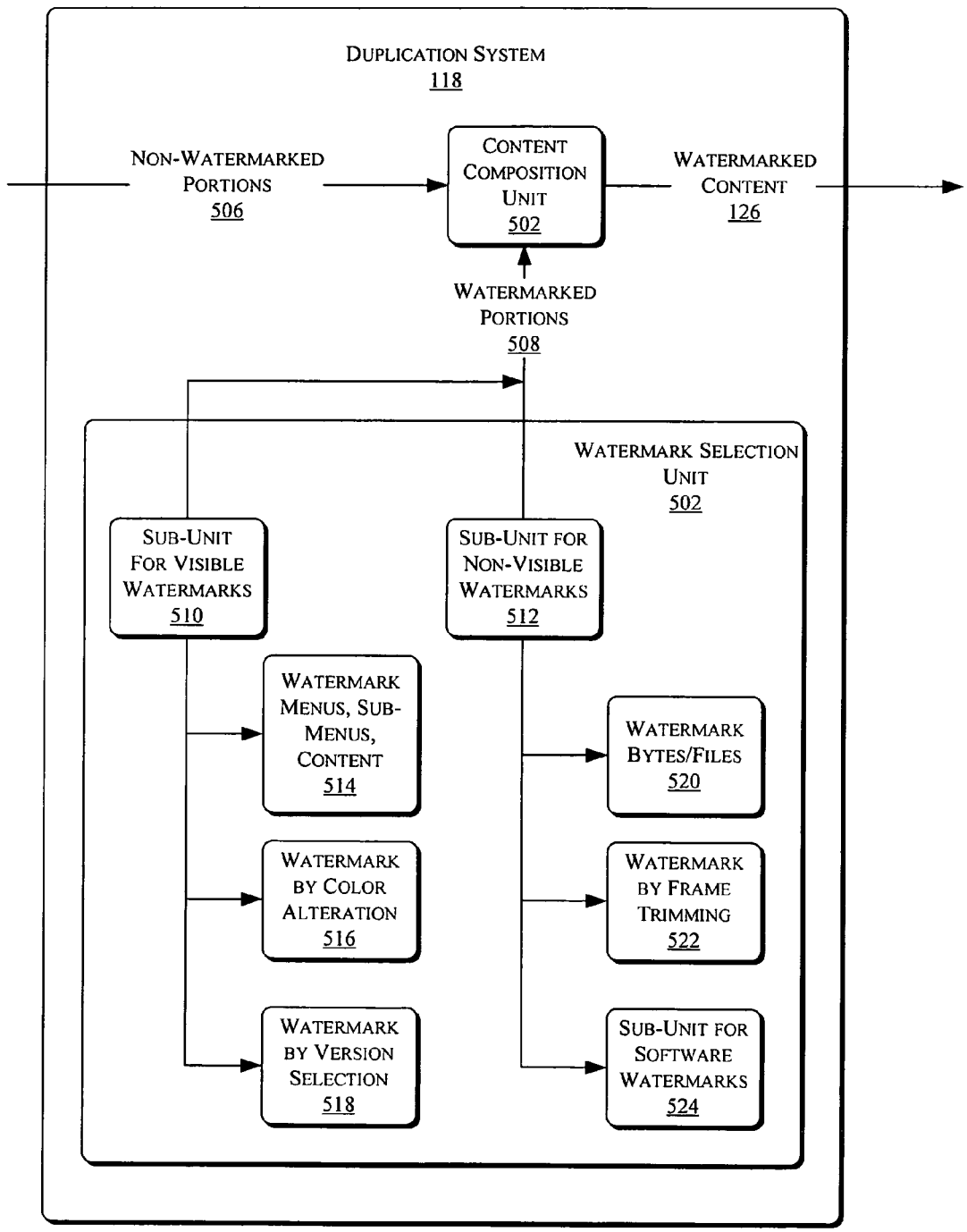
FIG. 5 is a block diagram of further architectural details related to a duplication system as shown in FIG. 1.

These descriptions of the webserver 112 and the duplication system 118 are presented in connection with FIGS. 4 and 5, respectively.

FIG. 4 illustrates further architectural details related to the webserver 112 as shown in FIG. 1. The webserver 112 includes a user interface unit 402, which is adapted to present any forms, fields, dialog boxes, or the like to the customer 110, and to capture any data provided by the customer 110. The user interface unit 402 can further include an order entry sub-unit 404, and a watermark selection sub-unit 406.

It is noted that the webserver 112 can include at least one processor and memory, and that the various components of the webserver 112 as shown in FIG. 4 can be implemented, at least in part, as software stored in and executed from such memory by the processor. The webserver 112 can be implemented, at least in part, using the illustrative computing environment shown in FIG. 15.

The order entry sub-unit 404 is adapted to present any forms, fields, dialog boxes, or the like that enable the customer 110 to provide personal information related to an order. For example, turning briefly to FIG. 2, the order entry sub-unit 404 may facilitate the capture of the data contained in the name field 204, the contact information field 206, and the title of ordered content field 212.

The watermark selection sub-unit 406 is adapted to present any forms, fields, dialog boxes, or the like that enable the customer 110 to select a watermark and/or watermarking method related to a given title of ordered content, assuming that the customer 110 is permitted to do so for that given title. In some instances, the webserver 112 may offer the customer 110 one or more incentives to induce the customer 110 to have his or her ordered content watermarked, or to have the ordered content watermarked using particular methods. The incentive can be varied for different watermarking methods. Recall that the content providers 124 may or may not allow the customers 110 to select watermarks and/or watermarking methods for the various titles of content provided by such content providers 124.

If the content provider 124 for a given title does allow customer selection of watermarks, the watermark selection sub-unit 406 enables the customer 110 to select from among the watermarks and/or watermarking methods permitted for that title. A watermark library 408 maintained locally by the webserver 112 can store the watermarks and/or watermarking methods that are available or permitted for a given title, for reference by the watermark selection sub-unit 406. Alternatively, the watermark library 408 may store all watermarks and/or watermarking methods that are supported by the operating environment 100, and the watermark selection sub-unit 406 can filter the watermarks and/or watermarking methods on a per-title basis per specifications of the content providers 124. In this manner, the watermark selection sub-unit 406 can present the customer 110 only with the watermarks and/or watermarking methods permitted by the content providers 124. In any event, the watermark library 408 can be populated based on entries in the content database 122.

It is noted that where the content provider 124 does not permit customer choice of watermark and/or watermarking method for a given title, the watermark selection sub-unit 406 may be bypassed for any orders of that title.

FIG. 5 illustrates further architectural details related to the duplication system 118 as shown in FIG. 1. It is noted that the duplication system 118 can include at least one processor and memory, and that the various components of the duplication system 118 as shown in FIG. 5 can be implemented, at least in part, as software stored in and executed from such memory by the processor. The duplication system 118 can be implemented, at least in part, using the illustrative computing environment shown in FIG. 15.

The duplication system 118 can include a content composition unit 502 and a watermark selection unit 504. The composition unit 502 is adapted to receive non-watermarked portions 506, which may be the contents of the field 312 shown in FIG. 5. The composition unit 502 is also adapted to receive watermarked portions 508, which are output from the watermark selection unit 504.

Turning to the watermark selection unit 504 in more detail, it can include a sub-unit 510 for embedding watermarks that are visible to a viewer of the watermarked content 126. The watermark selection unit 504 can also include a sub-unit 512 for embedding watermarks that are not visible to the viewer of the watermarked content 126. Each of these sub-units 510 and 512 are now described in more detail.

The visible watermark sub-unit 510 can include a component 514 for watermarking menus, sub-menus, and/or other content appearing within the watermarked content 126. Particular examples of these watermarking techniques are now given in connection with FIG. 6.

Figure 6:
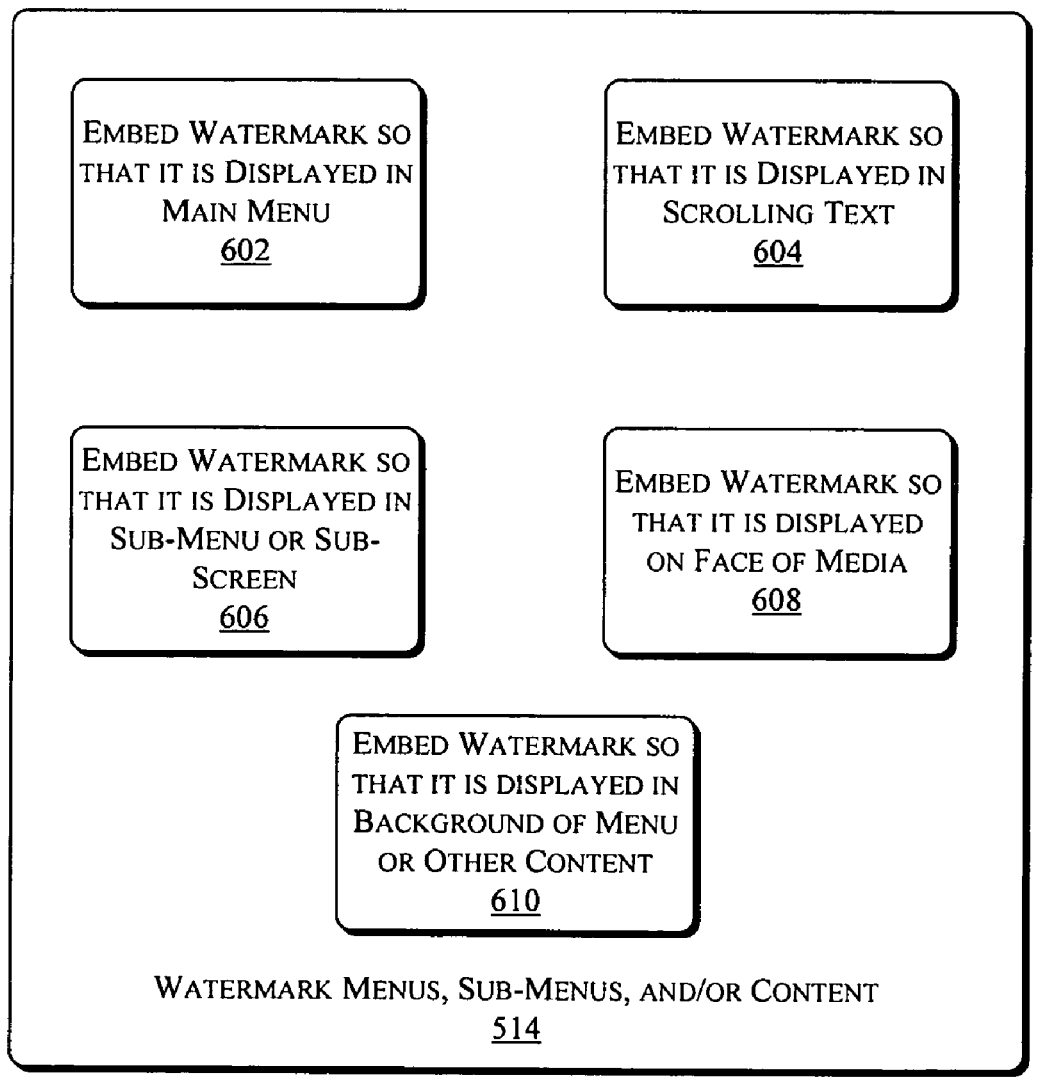
FIG. 6 is a block diagram of several examples of techniques for watermarking menus, sub-menus, and/or other content related to watermarked content.

FIG. 6 illustrates several examples of techniques 510 for watermarking, for example, menus, sub-menus, and/or other content related to the watermarked content 126. Each of these several techniques 514 are now described in turn.

Assuming that the content 126 is encoded onto media 128 in DVD form, block 602 represents embedding the visible watermark so that it is displayed on the main DVD menu when the content 126 is played back. Further description of the techniques of block 604 is provided by FIG. 7, which is now described.

Figure 7:
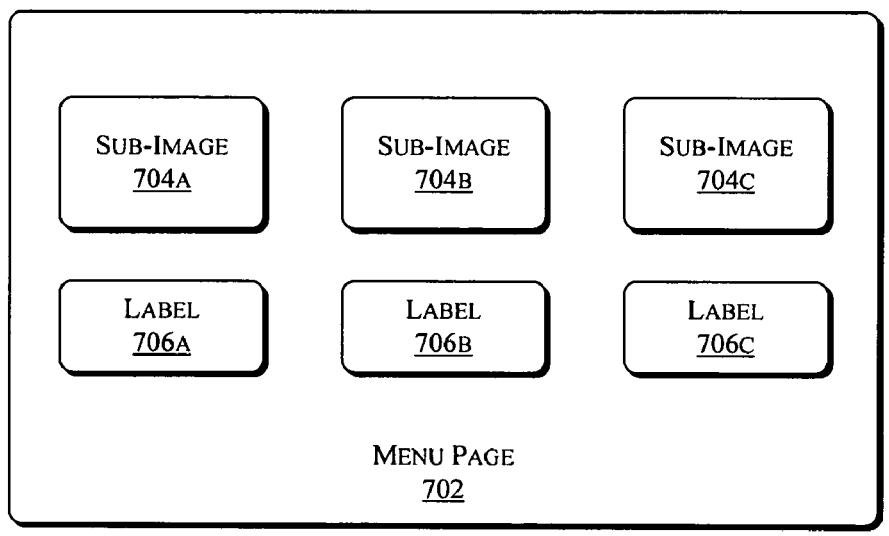
FIG. 7 is a block diagram of a menu page that may be presented when a customer plays a given instance of content as embedded on-demand with watermarks.

FIG. 7 illustrates a menu page 702 that may be presented during playback of the watermarked content 126, for example, by the customer 110 or other authorized viewer after the watermarked content 126 is delivered. The menu page 702 can include several sub-images 704, which may depict different options, scenes, or the like that may be encoded onto the watermarked content 126. For convenience, FIG. 7 shows three sub-images 704, referenced individually as 704a, 704b, and 704c, although any number of sub-images 704 may be included.

The menu page 702 can also contain labels 706 associated with each sub-image 704. As shown in FIG. 7, three labels 706a, 706b, and 706c are placed to correspond to the sub-images 704a, 704b, and 704c. The labels 706 can provide, for example, explanatory text related to the sub-images 704.

Implementations of the duplication system 118 can dynamically create a visibly, but subtly, different menu page 702 for each customer 110 by shifting the positions of the sub-images 704, altering the labels 706, or drawing from alternate choices for each sub-image 704. For instance, assuming a DVD implementation, if the sub-images 704 depict snapshots from the start of different scenes in the DVD, the operating environment 100 might choose the sub-images 704 from among several different snapshots from each scene. If there are 64 scenes, with 16 different snapshot choices per scene, each choice for the sub-images 704 can represent 4 bits of watermark data, for a total of 4×32=256 bits.

Having described the above example of a menu page 702 that may be presented during playback as a result of block 602 shown in FIG. 6, the discussion now returns to FIG. 6, resuming with discussion of block 604.

Block 604 represents embedding the visible watermark so that it is displayed in a banner located in various screen locations during playback of the content 126. For example, the duplication system 118 can perform this embedding. The duplication system 118 can cause a media player, for example, to scroll this banner across the image at various points during playback of the watermarked content 126.

Block 606 represents embedding the visible watermark so that it is displayed in a sub-screen reachable from the main menu of the watermarked content 126. Block 606 is thus somewhat related to block 602, although block 606 pertains more to sub-menus, rather than a main menu. Therefore, the description of FIG. 7 applies equally to the sub-menus or sub-screens referenced in block 606.

Block 608 represents embedding the visible watermark so that it is displayed or printed on the DVD, for example, on the face of the DVD or other tangible manifestation of the watermarked content 126. In some implementations of block 608, the watermark may include a visible, personalized watermark that openly displays information, such as the customer's name, contact information for the customer, and/or other information. For example, the visible watermark might read "Property of John Doe. If lost or stolen, please call 123 456-7890". This visible watermark may deter John Doe from creating unauthorized copies of the watermarked content 126 or from permitting such unauthorized copying, since the visible watermark readily identifies John Doe as the origin of the unauthorized copies. It is also understood that this example "Property of John Doe" watermark can be embedded in the content 126 so that it is displayed prominently during playback of the content 126.

Block 610 represents embedding the visible watermark so that it is displayed in the background of the main menu, or is otherwise displayed during playback of the watermarked content 126. For example, the duplication system 118 may cause the media player to display the watermark so that it is visible and/or noticeable during playback.

In these and other implementations, the watermark can be embedded in locations from which it would be relatively difficult to remove or edit out. The visible watermark can personalize the DVD and thereby discourage copying, since the name of the customer 110 would appear noticeably in any copy. In some implementations, various forms of the visible watermarks can be combined with other types of watermarks and/or watermarking techniques as described herein.

Having described various examples of the visible watermarks 514 as they may be embedded in menus, sub-menus, and/or other content of the watermarked content 126, the discussion now returns to FIG. 5, resuming with block 516.

The visible watermark sub-unit 510 can also include a component 516 that is adapted to embed a watermark by altering the color of content appearing to the viewer when the watermarked content 126 is played back. For more detail on color alteration component 516, FIG. 8 is now described.

Figure 8:
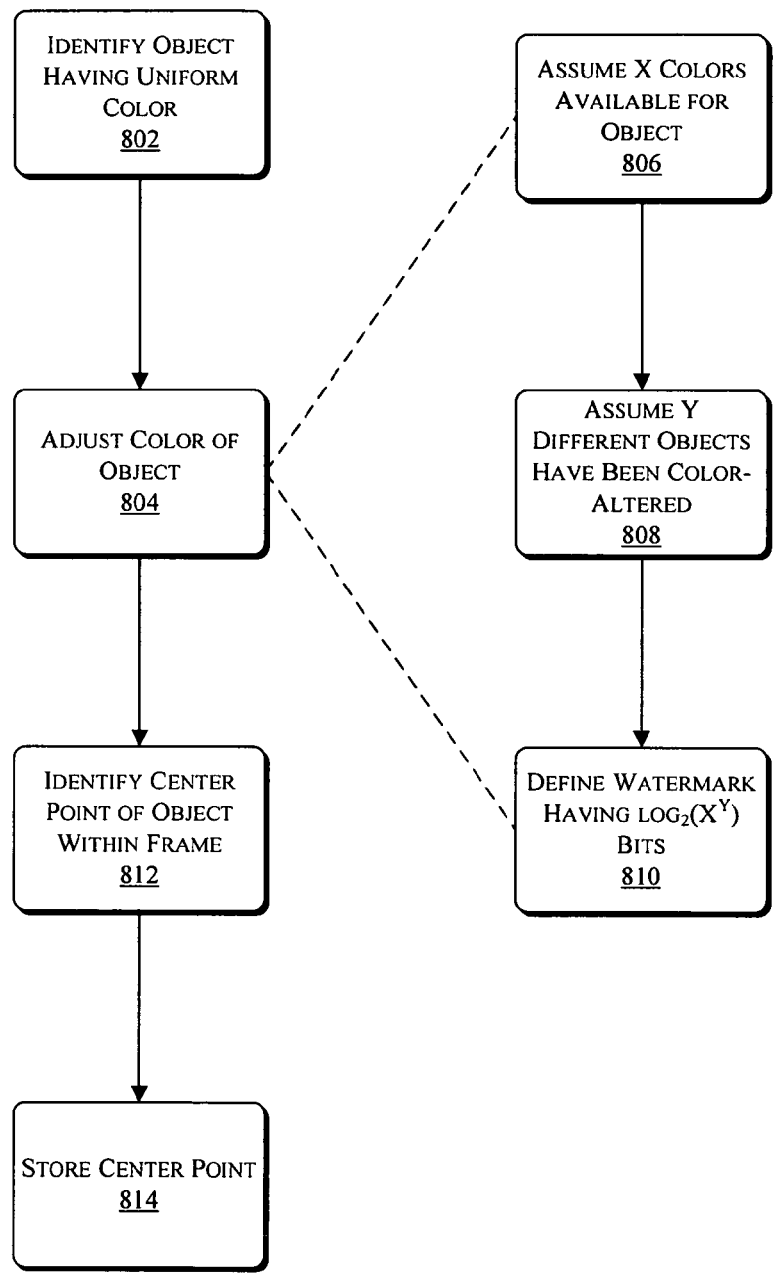
FIG. 8 is a flow diagram of a process for embedding watermarks by altering a color of an object appearing within digital content stored on the watermarked content.

FIG. 8 illustrates a process flow 800 for embedding a content modification watermark by altering a color of one or more objects appearing in, for example, a sequence of video. Thus, the process flow 800 may be performed by implementations of block 516 shown in FIG. 5. As such, the process flow 800 may be performed by the duplication system 118.

Block 802 represents identifying one or more objects that have uniform color and that appear to a viewer during playback of the watermarked content 126. Examples of such objects can include an article of clothing, the cover of a book, or the like.

Block 804 represents adjusting the color of the object, choosing the new color from an available palette of colors. In an example represented by blocks 806-810, given 16 different color choices per object (block 806), and 64 different objects within the video that are color-adjusted (block 808), 256 bits of watermarking could be embedded in the color changes (block 810). In general, given X color choices per object, and Y different objects, an N-bit watermark can be defined, where $N=\log_2(X^Y)$.

Block 812 represents defining a reference point of the object identified in block 802. The reference point can be, for example, a center point of the object or other suitable reference point. Additionally, the reference point can be defined relative to a frame of, for example, a video in which the object appears.

Block 814 represents storing the reference point of the object whose color is altered, for later reference when detecting the watermark. In this manner, the component that is detecting the watermark embedded by the process flow 800 knows which object had its color altered to embed the watermark.

As a result of the process flow 800, assuming a DVD implementation, each DVD customer 110 would, in effect, receive a slightly different version of the same title of DVD. In these different versions, the color of various minor background objects can be shifted so as to communicate or embed a watermark.

Having described the process flow 800 that can implement block 516 shown in FIG. 5, the discussion now returns to FIG. 5, resuming with the block 518.

Block 518 represents embedding a watermark by selecting various alternative versions of content that may be made available by, for example, the content providers 124. Recall from the discussion of FIG. 3 that field 306 can contain a plurality of different versions of various segments of the content. for these various segments, the watermark selection unit 504 can select different alternatives, so as to embed a watermark.

Having discussed the above examples of visible watermarks that can be embedded by the sub-unit 510, the description now turns to the non-visible watermarks that can be embedded by the sub-unit 512. For convenience of description, but not limitation, the sub-unit 512 is discussed in connection with watermarks that are not visible to the viewer when the watermarked content 126 is played back. For convenience, but not limitation, the non-visible watermarks may be organized into techniques for watermarking bytes and/or files, as represented by block 520, and into techniques for watermarking by frame trimming, as represented by block 522. These techniques are now discussed in connection with FIGS. 9 and 10, respectively.

Figure 9:
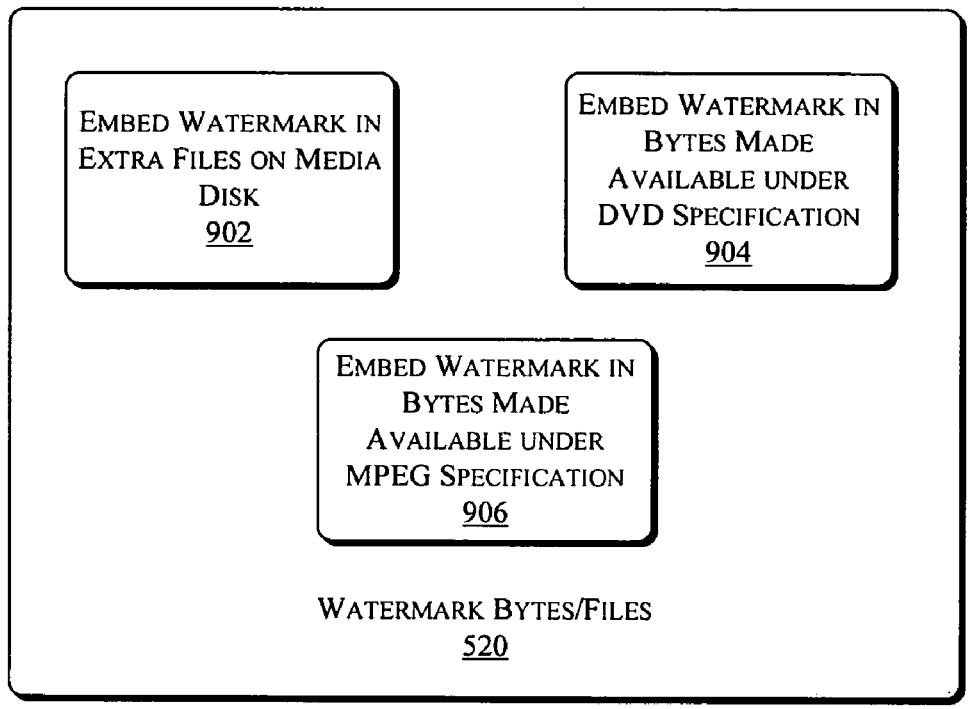
FIG. 9 is a block diagram of several techniques for embedding non-visual watermarks in bytes and/or files, expanding on processing shown in FIG. 5.

FIG. 9 illustrative several techniques for embedding non-visual watermarks in bytes and/or files, expanding on block 520 shown in FIG. 5.

Block 902 represents embedding non-visible watermarks in file(s) that are encoded onto the media 128 specifically to hold the watermarks. In this sense, these files can be viewed as additional or extra files. For example, the DVD Video Specification permits additional files to be stored in areas on the disc that are ignored by DVD Video players.

Block 904 represents embedding the non-visible watermarks in bytes of pre-existing file structures that do not already contain data. Thus, these pre-existing bytes are available to hold other data, such as the non-visible watermarks. For example, the DVD Video Specification defines file structures that include blank areas within files, in areas allocated to either header data or content data, where byte values are unimportant and are ignored by DVD players. Thus, the bytes of the non-visible watermarks can be stored in these otherwise blank and/or ignored locations.

Block 906 represents embedding the non-visible watermarks in bytes of pre-existing file structures that do not already contain data. In this sense, the processing represented by block 906 is similar to that represented by block 904. However, in block 906, the non-visible watermarks can be embedded in available bytes as defined under the MPEG File Specification. As with the DVD Specification above, the bytes of the non-visible watermarks may be stored in the header areas or in the content areas of bytes in MPEG file structures.

Having described the above techniques for embedding non-visual watermarks in bytes and/or files, the discussion returns to FIG. 5, resuming with block 522. Block 522 represents embedding non-visible watermarks by trimming some number of frames from the chapters of content encoded onto the watermarked content 126. The terms "chapter" and "content" are defined in, for example, the DVD Specification. For more detail regarding the processing represented by block 522, FIG. 10 is now described.

Figure 10:
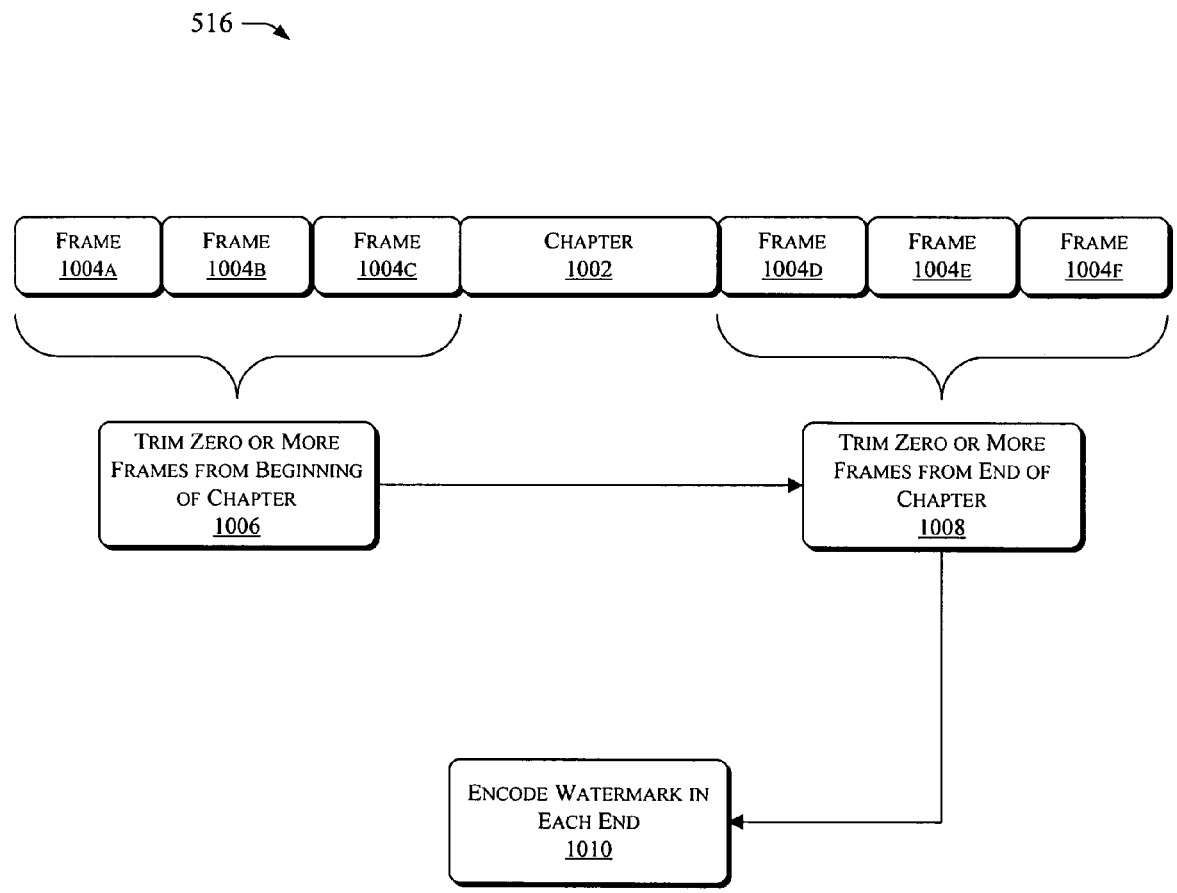
FIG. 10 is a combined block and flow diagram of a chapter and a plurality of frames appearing before and after the chapter, and of a process flow for encoding a non-visible watermark by trimming some number of the frames from before and after the chapter.

FIG. 10 illustrates a chapter 1002 and a plurality of frames 1004 appearing before and after the chapter 1002, and a process flow for encoding a non-visible watermark by trimming some number of the frames 1004 from before and after the chapter 1002. The chapter 1002 and frames 1004 may be defined with reference to, for example, the DVD Specification. For convenience but not limitation, FIG. 10 shows three frames 1004a, 1004b, and 1004c appearing before the chapter 1002, and three frames 1004d, 1004e, and 1004f appearing after the chapter 1002. However, any number of frames 1004 may appear before or after the chapter 1002.

Given the arrangement shown in FIG. 10, a watermark can be encoded by trimming different numbers of frames 1004 from each end of the chapter 1002. For example, in the implementation shown in FIG. 10, block 1006 can trim zero to three of the frames 1004a, 1004b, and 1004c from before the chapter 1002. Also, block 1008 can trim another zero to three of the frames 1004d, 1004e, and 1004f from after the chapter 1002. In this manner, block 1010 can encode or embed two bits of watermark data to each end of each chapter 1002 by selecting the number of frames 1004 to trim.

Having described the above techniques for embedding non-visible watermarks by trimming frames from chapters as encoded onto the watermarked content 126, the discussion returns to FIG. 5, resuming with block 524.

The sub-unit 512 can include a component 524 for embedding watermarks into watermarked content 126 that contains executable software code. The component 524 can employ several different techniques for watermarking content 126 that contains software, and these techniques can be applied to the on-demand duplication of such software content, and the encoding of such content onto suitable media. Examples of such media include, for example, DVDs or CD-ROMs, although intangible forms of such media are also contemplated herein.

In a first example of software watermarking, the sub component 524 can adjust or alter the layout or order of menu items within a software application in different ways to encode a watermark. The component 524 can also adjust or alter the layout of controls within various dialogs. In other implementations, the component 524 can replace blocks of code with various logically-equivalent versions. For example, the component 524 can use optimizing-compiler technology to automatically generate these various versions of the code. The component 524 can also store extra files containing the watermark on the disc containing the software content. In another alternative, the component 524 can add the watermark to files already existing on the disk, for example, by appending bytes to existing files, or storing the watermark in unused bytes, or the like.

Figure 11:
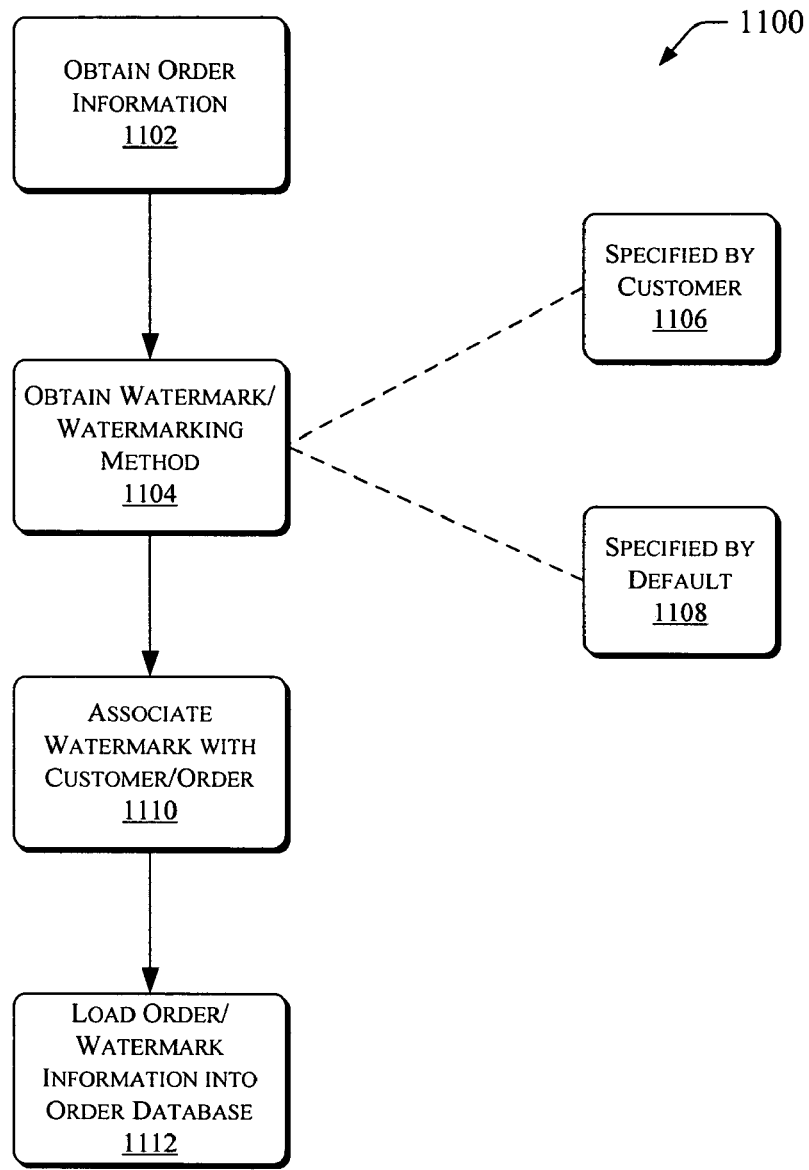
FIG. 11 is a flow diagram of a process for taking orders from customers in the context of on-demand watermarking of content.
Figure 12:
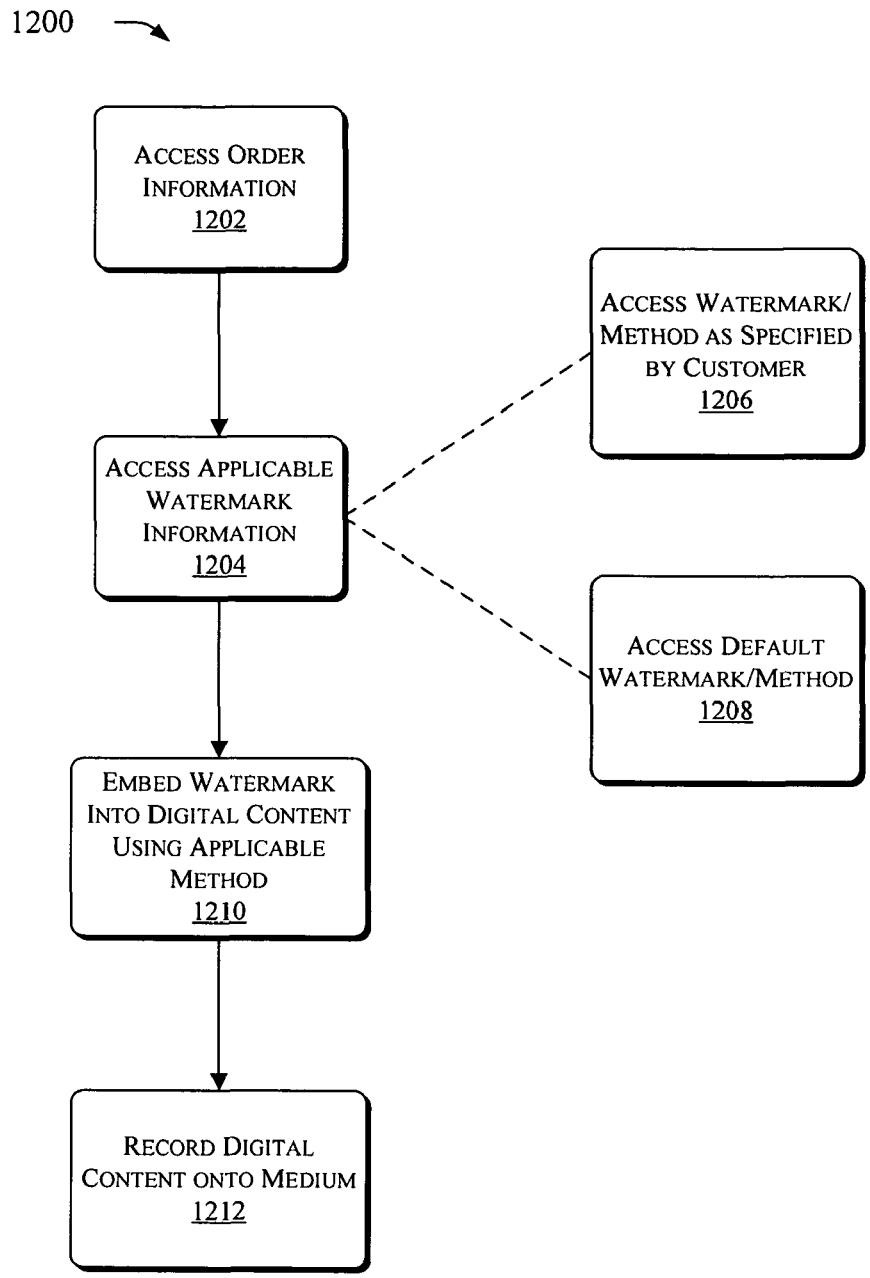
FIG. 12 is a flow diagram of a process for fulfilling orders for content in the context of on-demand watermarking of the content.

FIGS. 11 and 12 illustrate example processes for conducting on-demand watermarking of content. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process shown in FIG. 11 is described with reference to the web server 112 of FIG. 1, and process shown in FIG. 12 is described with reference to the duplication system 118 of FIG. 1. It is noted, however, that the processes shown in FIGS. 11 and 12 can be implemented, at least in part, on components and systems other than the web server 112 and the duplication system 118. Users or customers 110 referred to in the following, as well as the foregoing, are generally interfacing with the device 102, or similar computing device, of the type described herein with reference to FIG. 1.

FIG. 11 illustrates a process flow 1100 for taking orders from customers 110 in the context of on-demand watermarking of content. For convenience and ease of discussion, the process flow 1100 is described here in connection with certain aspects of the operating environment 100. In that context, the operations represented by flow 1100 may be performed, for example, by the web server 112 when interacting with customer 110. However, it is understood that the process flow 1100 may be implemented on devices or components other than those shown in the operating environment 100 without departing from the spirit and scope of the description herein.

At block 1102, order information is obtained from the customer 110. This can include serving pages to the customer 110 upon request when the customer 110 hits a website, for example, and using these pages to obtain the order information from the customer 110. More particularly, a customer ordering content to be encoded onto media, such as a DVD, interacts with the web server 112 using the application 108, such as a browser. In response to a request from the customer, the web server 112 serves one or more web pages that include forms to collect the customer's order information. The customer 110 can provide any order information 114 that is pertinent to fulfilling the customer's orders. Examples of such information 114 are described above in connection with FIGS. 1 and 2. For example, the web server 112 receives the order information 114 from the customer 110 and organizes it into appropriate records for storage and later reference when fulfilling the orders. A suitable example is the order record 202 shown in FIG. 2.

At block 1104, any watermark information and/or methods to be used in duplicating the content ordered by the customers 110 is obtained. Recall from the discussion above that the customer 110 may be offered the ability to specify, for example, a personalized watermark that is to be embedded in content ordered by the customer 110. Also, the customer 110 may be offered the ability to select from a variety of different available watermarking methods, which are described in further detail below. These scenarios are represented generally by block 1206.

Recall also from the discussion above that for at least some titles of the content, certain watermarks and/or watermarking methods are specified by default, for example by the content providers 124. In these cases, the customer 110 may or may not be enabled to override these defaults. These scenarios are represented generally by block 1108.

At block 1110, a particular watermark can be associated with the customer 110. As discussed elsewhere herein, a watermark defined by block 1110 can also be customized or personalized for a particular customer 110.

At block 1112, the order information 114 resulting from each order placed by the customers 110 is loaded into a suitable data store, such as the order database 116. The orders as stored in the order database 116 may then be fulfilled in due course, as described now in connection with FIG. 12.

FIG. 12 illustrates a process flow 1200 for fulfilling orders for content in the context of on-demand watermarking of the content. While the process flow 1200 is described in connection with the duplication system 118 as shown in FIG. 1, it is noted that the process flow can be implemented by other components without departing from the scope of the description herein.

At block 1202, order information 114 for various orders placed by the customers 110 is accessed and processed in turn. For example, the order information 114 can be retrieved from the order database 116.

In block 1204, the watermark and/or watermarking method applicable to a given order is accessed. As noted above, a customer 110 may specify the watermark and/or watermarking method to be used in fulfilling the customer's order, as represented by block 1206. In this scenario, the field 214 in the order database 116 may contain the user-selected watermark and/or method. Alternatively, or additionally, the watermark and/or watermarking method to be used in fulfilling the customer's order may be specified by default, for example, by a content provider 124, as represented by block 1208. These default watermarks and/or watermarking methods may be specified, for example, on a per-title basis, and these defaults may or may not be overridden by the customers 110. In this scenario, the field 310 in the content database 122 may contain the provider-specified watermark and/or method.

At block 1210, the one or more applicable watermarks are embedded or otherwise applied to the digital content ordered by the customer 110, using the applicable watermarking method(s). In the context of the FIG. 1 environment, the duplications system 118 extracts the applicable watermark and/or method from, for example, field 214 or field 310, and embeds the applicable watermark onto the content 120 corresponding to the title ordered by the customer 110. The watermarked content is then stored onto the media 128, as represented by block 1212.

Various examples of possible watermarking methods were described in detail above. It is noted that these watermarks and/or watermarking methods are applied to the content on a per-order basis, as the orders from the customers 110 are processed in turn. Thus, the processing described herein may be viewed as on-demand watermarking of the content, as distinguished from watermarking methods in which the content are watermarked in bulk with similar watermarks using similar methods. In this manner, the watermark can be formulated, at least in part, based on the identity or other information specific to the customer 110. In some implementations, the watermark can be personalized or customized specifically for the customer 110, or for an order placed by the customer 110. Such personalized or customized watermarks may discourage the customer 110 from freely distributing copies of the watermarked content 126, since the personalized watermark will indicate the origin of any unauthorized copies, i.e., the customer 110.

It is noted that, in some implementations, the watermarked content 126 is watermarked after the order for that content 126 is placed by the customer 110. Once the order is placed, the identity of the customer 110 who is obtaining the content 126 is known, and information specific and/or personal to the customer 110 is now available as input to the watermarking process.

Watermarks

Watermarks applied herein can be visible to the viewer during playback of the content 126, can be visible on any tangible medium 128 on which the content 126 is encoded, or may be non-visible to a viewer. An example of the latter are watermarks embedded in files stored on the medium 128. Some implementations of the teachings herein can extend watermarking approaches so as to apply these approaches to embedding personalized watermarks. For example, such approaches may include adding nonperceptible perturbations to pixel values, modifying DCT coefficients, altering interframe differences, or the like. These approaches can extended to embedding a personalized watermark, for example, by applying these techniques to embedding the watermark in the form of a name, phone number, or other customer-specified data on an on-demand or per-order basis.

Some implementations of the subject matter described herein can embed watermarks so that they alter the perceptual content of the media 126 into which the watermarks are embedded. However, the alterations to the perceptual content are not obvious to the end-viewer or end-user of the m content 126. This technique differs from other approaches, in which the embedded watermarks do not alter the perceptual content of the content into which they are embedded. However, these non-perceptual watermarks may be vulnerable to lossy compression or encoding algorithms, because such algorithms may omit non-perceptual information from the content during processing. Thus, the non-perceptual watermarks may be discarded, along with other non-perceptual information, during the algorithm's normal operation.

In contrast, perceptual, but non-obvious, watermarks are not vulnerable to such algorithms, because these algorithms are designed to maintain perceptual content, even if such perceptual content is not immediately apparent to the viewer or user. As such, these perceptual, but non-obvious watermarks may be referred to as "sub-cognitive" watermarks for the purposes of this description. Because these sub-cognitive watermarks contain perceptual data, these watermarks would be expected to survive any encoding/decoding and/or compression/decompression process that preserves perceptual data.

Any or all of the methods described above may be used in combination to strengthen the watermark and related protection. Also, different methods may be used at different times to make detecting and removing the watermark more difficult.

Detection of Watermarks

Figure 13:
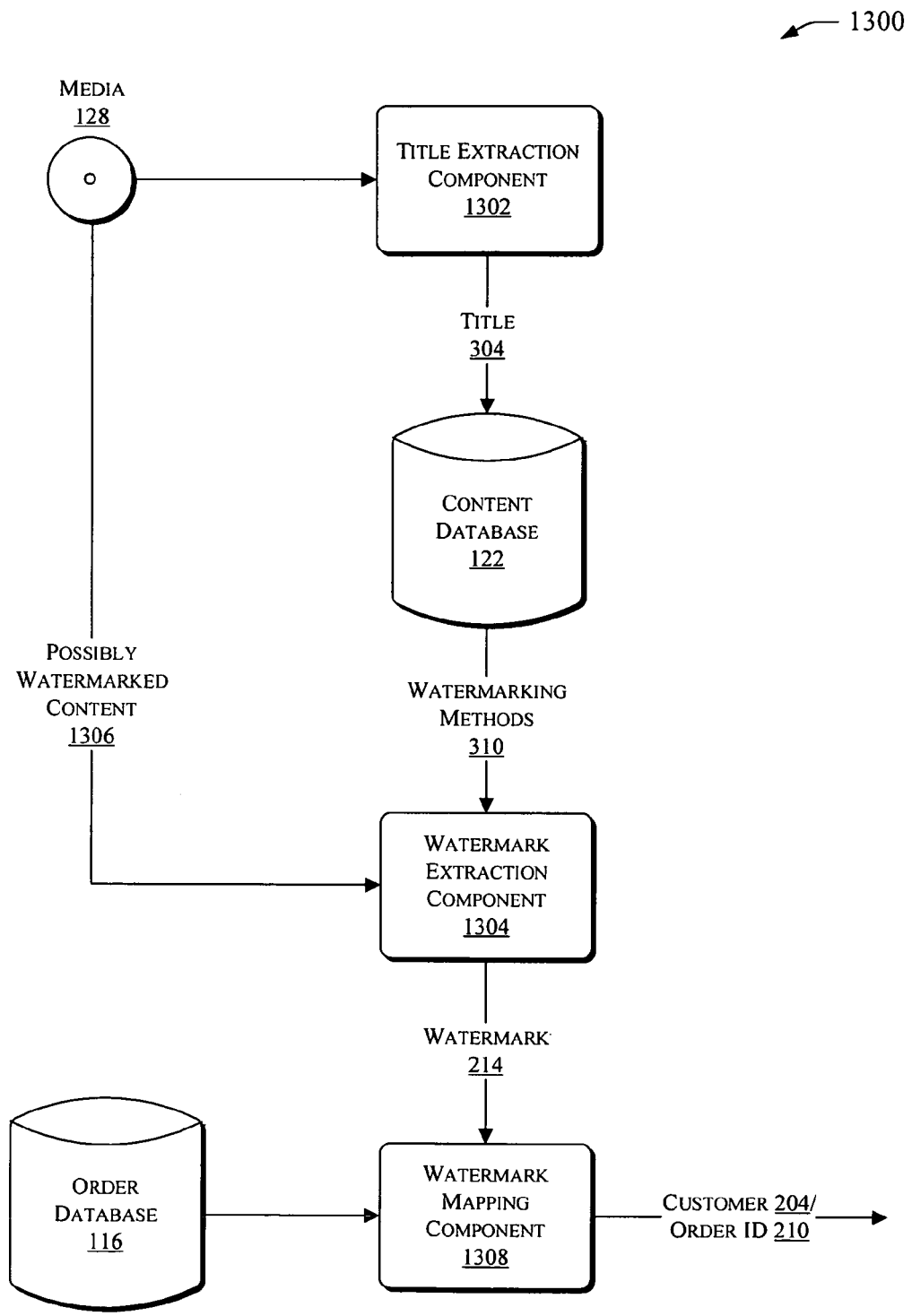
FIG. 13 is a block diagram of an operating environment for detecting watermarks as embedded in the watermarked content.

FIG. 13 illustrates an operating environment 1300 for detecting watermarks as embedded in media 128, as shown in FIG. 1. A title extraction component 1302 can be operative to read a title 304 from the media 128. Recall that the titles of various content that are available for order by the customers 110 can be stored in, for example, field 304 of the content database 122, as shown in FIGS. 1 and 3. When the customers 110 order a given title of the content, the data representing the title can be extracted from field 304 and copied into a suitable location in the media 128. Thus, for convenience, the title of the media 128 is referenced as 304.

The title extraction component 1302 can query the content database 122, or a database containing similar information, using the title 304. Recall that the content database can specify available or specified watermarks and/or methods in, for example, a field 310.

In any event, data representing watermarking methods possible for the media 128 can be passed to a watermark extraction component 1304. The watermark extraction component can also receive possibly watermarked content 1306 from the media 128. In some instances, the media may contain content that is not watermarked. The watermarked content 1306 determines whether the content 1306 is watermarked using any of the possible methods 310. If the content 1306 is watermarked using any of the possible methods 310, then the watermark extraction component 1304 extracts the watermark therefrom and passes it to a watermark mapping component 1308.

The output from the watermark extraction component 1304 is referenced as the watermark 214. Recall from the above description of FIG. 2 that the order database 116 contains a respective watermark field 214 for the order records 202. The watermark mapping component 1308 can query a database, such as the order database 116 or another database containing similar information, with the watermark information 214 received from the watermark extraction component 1304. If the watermark mapping component 1308 locates a record in the database whose field 214 matches for the input watermark 214, the watermark mapping component 1308 can return the fields 204 and/or 210 from that record.

It is understood that different implementations may wish to map the input watermark 214 to a specific customer name 204, and/or to a specific order ID 210. Other mappings may be possible as well. In any event, the operating environment 1300 may facilitate identifying a customer of the media 128, whether for forensic investigations into unauthorized copying of the media 128, or for determining whether a person requesting playback of the media 128 is authorized to receive such playback.

Figure 14:
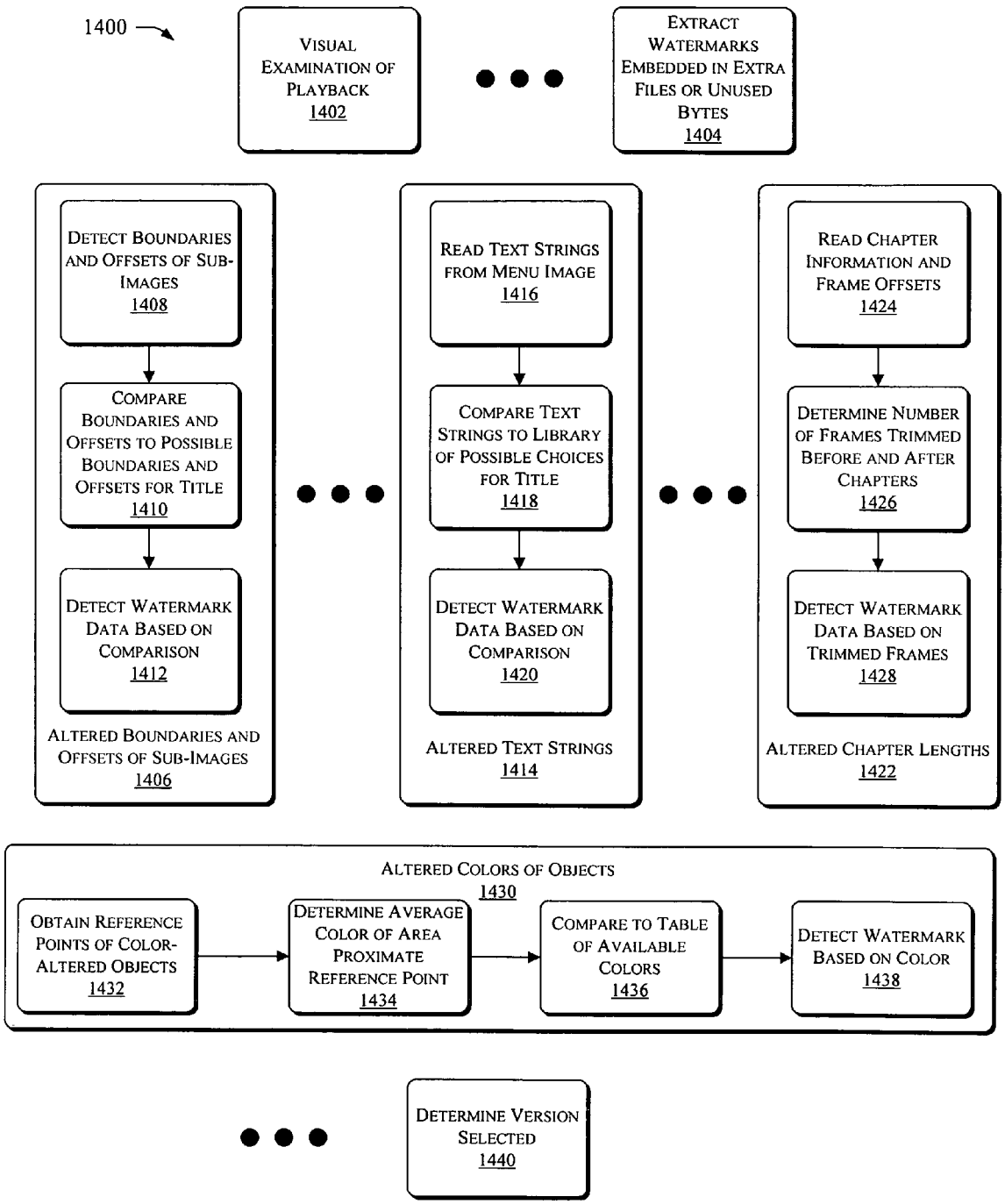
FIG. 14 is a block diagram of various techniques for detecting watermarks embedded in the watermarked content.

FIG. 14 illustrates various techniques 1400 for detecting watermarks embedded in the watermarked content 126. These techniques 1400 may be implemented in whole or in part by the watermark extraction component 1304, although other components may implement one or more of these techniques 1400 without departing from the scope and spirit of the subject matter described herein.

In block 1402, visible, personalized watermarks may be detected by examination of a playback of the watermarked media 126 under analysis. For non-personalized and/or non-visible watermarks, apparatus such as the watermark extraction component 1304 may be used to detect the various types of watermarks described above. As such, the watermark extraction component 1304 can include a general-purpose computing system that is equipped with software implementing one or more of the techniques 1400, and with a media reader or player adapted for reading the media 128.

In block 1404, watermarks that are embedded in additional files on a disk containing the watermarked content 126, or that are embedded within unused bytes within pre-existing files on the watermarked content 126 can be detected. Assuming a DVD implementation, block 1404 can represent extracting these bytes using standard software libraries for reading DVD media.

Recall from the above discussion of FIG. 7 that watermarks may be embedded by altering the boundaries and/or offsets of sub-images 704 appearing within a menu page 702 that may be presented by playing the watermarked content 126. Block 1406 represents detecting such watermarks embedded by adjusting such sub-images 704. More particularly, block 1408 represents detecting the boundaries and offsets of the sub-images 704, using, for example, suitable image processing algorithms. Block 1410 represents comparing the detected boundaries and offsets to the boundaries and offsets that are possible for the given title of the watermarked content 126. Based on this comparison, the watermark can be detected in block 1412.

As an example of the foregoing, assume that for a given title of the watermarked content 126, there are 16 possible choices of offsets for the sub-images 704. Assume further that the boundary of a given sub-image 704 is detected at an offset corresponding to the 5th of these given choices. In this example, block 1412 represents indicating that the bits "0101" are detected, at least as part of a larger watermark.

Recall also from the above discussion of FIG. 7 that watermarks may be embedded by altering labels 706 or other text appearing within the menu page 702. In block 1414, these watermarks as embedded by adjusting the labels 706 or other associated text can be detected. More particularly, block 1416 represents reading the associated labels 706 or other text strings from an image of the menu page 702, for example, by using character recognition software. Block 1418 represents comparing these strings to a library of string choices available for the given title of the watermarked content 126 to determine which string choices were made. Based on this comparison, block 1420 represents detecting which watermark data the string choices represent.

As an example of the foregoing, assume that there are 16 possible alternatives for the text of a given label 706 or other text string appearing in a given menu page 702. Assuming that character recognition software identifies choice 5 (binary "0101") as the label 706 actually present on the menu page 702, then block 1520 represents detecting the four bits "0101" as part of a larger watermark.

Recall from the above discussion of FIG. 10 that watermarks may be embedded by altering the lengths of the chapters 1002 in some pre-defined manner. Block 1422 in FIG. 14 represents detecting such watermarks. More particularly, block 1424 represents reading information pertaining to particular chapters 1002 appearing in the watermarked content 126. Block 1424 also represents reading information pertaining to the offsets of any frames 1004 appearing before or after the chapters 1002. Assuming a DVD implementation, block 1424 represents using, for example, DVD library software. Block 1426 represents determining the number of frames 1004 that were trimmed from either end of each chapter 1002. Block 1428 represents detecting the watermark embedded by such trimming of the frames 1004 appearing before and/or after the chapters 1002.

As an example of the foregoing, assume that up to three (3) frames 1004 can be trimmed from before and/or after a given chapter 1002. Assuming, in a given instance, that two (2) frames 1004 trimmed from before and/or after a given chapter 1002, then block 1428 represents detecting the two bits "10" as at least part of the watermark data.

Recall from the above discussion of FIG. 8 that watermarks can be embedded by altering the color of one or more objects appearing in the watermarked content 126. Block 1430 represents detecting watermarks embedded by so altering the color of such objects. More particularly, block 1432 represents obtaining reference points for the objects whose colors were altered in embedding the watermark. Recall that these reference points were stored previously when the color-altered watermarks were embedded. The reference point of the object may be, for example, the center point of the object.

Block 1434 represents determining the average color of a pixel or a neighborhood of pixels proximate the reference point of the object. For example, block 1434 can represent using image processing software to decode the compressed video frame, and to extract the data representing the average color encoded proximate the reference point. Block 1436 represents comparing this color with a table of colors available for embedding the color-content watermark. Based on this comparison, block 1438 represents detecting the watermark data as embedded by the color of the object. For example, given a table of sixteen (16) available colors in which the object may be rendered, four (4) bits of watermark data may be embedded by selecting from among these color choices.

Recall from the discussion of FIG. 3 above that watermarks can be embedded by selecting alternative versions of various segments of the content. Recall also that the various segments may be arranged along a temporal axis or along one or more spatial axes. Block 1440 in FIG. 14 represents detecting a temporal or spatial watermark embedded using such techniques.

Having provided the foregoing descriptions of the various operating environments 100 and 1300, it is noted that a business enterprise or other entity could operate at least some aspects of these environments 100 and 1300 on behalf of clients. Examples of these clients may be the customers 110, and/or the content providers 124, as well as other entities. For example, such an enterprise may operate at least part of the environment 100 to enable the customer 110 to obtain the content 126, and to enable the content providers 124 to have the content 126 watermarked. This same enterprise, or a different enterprise altogether, may operate at least part of the environment 1300 to provide authentication, authorization, or forensic investigation services to clients. Examples of these clients may be the customers 110, the content providers 124, as well as other entities.

Computing Environment

Figure 15:
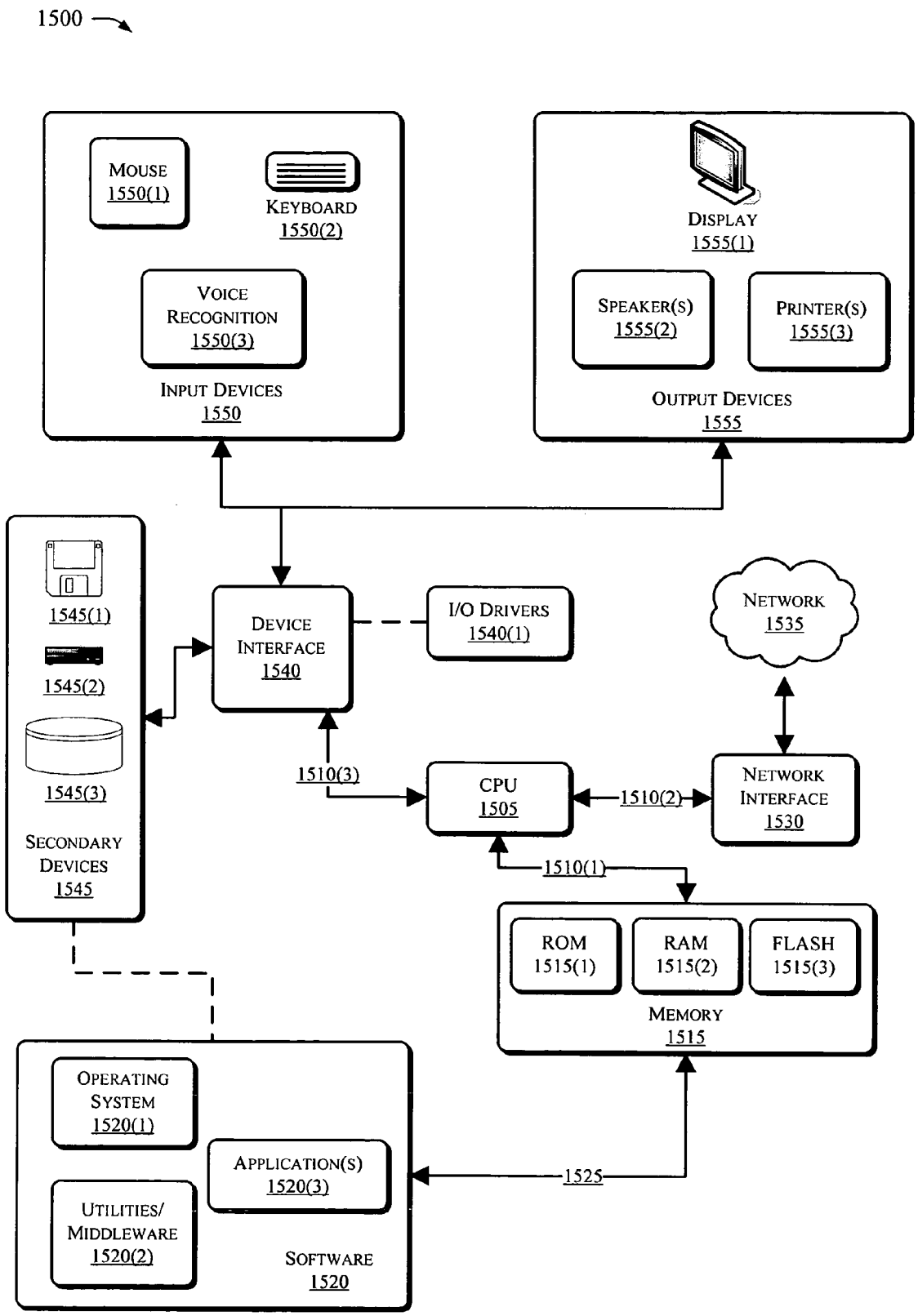
FIG. 15 is a block diagram of an overall computing environment for implementing on-demand watermarking of content.

FIG. 15 illustrates an overall computing environment 1500 for implementing on-demand watermarking of content. For example, the computing environment 1500 may be suitable for implementing aspects of at least the device 102, the web server 112, the duplication system 118, the title extraction component 1302, the watermark extraction component 1304, and the watermark mapping component 1308. Any of foregoing may be implemented, at least in part, as a computer-based device that includes a central processing unit (CPU) 1505. CPU 1505 communicates with a variety of components via busses 1510. It is understood that the layout of the busses 1510 is shown in FIG. 15 for convenience and clarity of illustration, and implementations of the teachings herein may integrate the respective busses 1510 into a common bus 1510.

The CPU 1505 communicates with a memory module 1515 via a bus 1510(1). The bus 1510(1) may be of any data width or any bandwidth as chosen by those skilled in the art for a given implementation. The memory module 1515 can include at least read-only memory (ROM) portion 1515(1), random-access memory (RAM) portion 1515(2), and flash portion 1515(3). Portions of the memory module 1515 can store software components 1520 during execution, as represented by the line 1525. The software components 1520 can include at least operating system components 1520(1), utility or middleware components 1520(2), and application components 1520(3).

The CPU 1505 can communicate with a network interface controller (NIC) 1530 via a bus 1510(2). The NIC 1530 enables the CPU 1505 to communicate with external devices via a network 1535, which may be a LAN, WAN, or any other type of communications network.

The CPU 1505 can communicate with peripheral devices via one or more device interfaces 1540. The device interface 1540 includes any device appropriate to interface the peripheral devices to communicate with the CPU 1505 via the bus 1510(3). Some peripheral devices may be associated with appropriate device driver software, which is represented generally by the block 1540(1).

FIG. 15 illustrates peripheral devices in the form of secondary storage devices 1545, input devices 1550, and output devices 1555. The secondary storage devices 1545 can include a drive 1545(1), for removable media, which can include magnetic media, optical media, or any other type of removable or portable media. The secondary storage devices 1545 can include a drive 1545(2) for fixed media, which can include hard disk drives or the like. The secondary storage devices 1545 can also include mass data storage unit 1545(3), which may house components such as the various data stores or databases illustrated and discussed herein.

The input devices 1550 enable customers 110 or other users to issue commands to the CPU 1505, and can include mouse 1550(1), keyboard 1550(2), and/or voice recognition unit 1550(3). The output devices 1555 enable the CPU 1505 provide some level or type of response to the customers 110 or other users, and can include display 1555(1), one or more audio speakers 1555(2), and one or more printers 1555(3), which can be of any configuration.

It is understood that computer-readable media suitable for storing software executing the processes taught herein can include at least the memory module 1515, the secondary storage devices 1545. It is further understood that signals representing the software executing the processes taught herein may be propagated via the busses 1510, the NIC 1530, and/or the network 1535.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain flow diagrams described and illustrated herein, it is noted that the processes and sub-processes depicted therein may be performed in orders other than those illustrated without departing from the spirit and scope of the description herein. Therefore, the orders are illustrated as shown only for convenience of discussion, and do not limit possible implementations of the subject matter described herein.

The invention claimed is:

1. A computer-implemented method comprising:
under control of one or more computer systems containing memory and configured with executable instructions stored in the memory,
obtaining information relating to at least one order placed by a customer for digital content stored in the memory, wherein the digital content comprises multiple video frames and multiple defined portions;
associating a watermark with the customer or the order;
trimming one or more video frames of the multiple video frames—of the digital content stored in the memory after the order is placed to represent the watermark, wherein the watermark is created by trimming at least one or more video frames before or after one of the multiple defined portions of the digital content; and storing the watermarked digital content onto at least one computer-readable storage medium after the order is placed.

2. The method of claim 1, wherein the obtaining information includes obtaining information specific to the order.

3. The method of claim 1, wherein the obtaining information includes obtaining personal information specific to a customer placing the order.

4. The method of claim 1, further comprising adapting the medium so that the medium displays a unique identifier of the customer.

5. A watermark embedding system comprising:
one or more processors;
memory;
a webserver stored in the memory and executable on the one or more processors to interact with at least one customer via a browser to obtain information related to at least one order for at least one title of digital content stored in the memory, the digital content comprising multiple video frames and multiple defined portions;
a duplication system stored in the memory and executable on the one or more processors to access the order information, to embed at least one watermark onto the digital content stored in the memory after the order is placed, and to encode the watermarked digital content onto at least one computer-readable storage medium; and
wherein the duplication system includes a component for embedding at least one watermark by trimming one or more video frames of the multiple video frames of the digital content, wherein the watermark is created by trimming at least one or more video frames before or after one of the multiple defined portions of the digital content.

6. The system of claim 5, wherein the webserver includes a watermark selection unit that is adapted to enable the customer to select the watermark or a watermarking technique to be used in watermarking the digital content.

7. The system of claim 6, wherein the webserver includes a watermark selection unit that is adapted to enable the customer to select the watermark or the watermarking technique from among a plurality of watermarks or watermarking techniques permitted for the title by a content provider for that title.

8. The system of claim 5, wherein the duplication system is adapted to embed a watermark that is specified by a content provider of the title into the digital content.

9. The system of claim 5, wherein the duplication system includes a unit for embedding visible watermarks and a unit for embedding non-visible watermarks.

10. The system of claim 5, wherein the duplication system includes a component for embedding at least one watermark by altering a color of at least one object appearing in the digital content.

11. The system of claim 5, wherein the duplication system includes a component for embedding at least one watermark so that the watermark is displayed when the digital content is played back.

12. The system of claim 5, wherein the duplication system includes a component for embedding at least one watermark by altering at least one sub-image or at least one label associated with at least one menu page displayed when the digital content is played back.

13. The method of claim 1, wherein the digital content comprises a video, and wherein the multiple defined portions of the digital content comprise respective chapters of the video.

14. The system of claim 5, wherein the digital content comprises a video, and wherein the multiple defined portions of the digital content comprise respective chapters of the video.

15. A computer-implemented method comprising:
under control of one or more computer systems containing memory and configured with executable instructions stored in the memory,
obtaining information relating to an order placed by a customer for digital content stored in the memory;
associating a watermark with the customer or the order;
embedding the watermark into the digital content stored in the memory after the order is placed by altering a sub-image of a menu page of the digital content that is displayed when the digital content is played back, wherein the watermark associated with the customer or the order is created based at least in part on how the sub-image of the menu page is altered, the altering of the sub-image of the menu page comprising shifting a position of the sub-image to uniquely represent the watermark associated with the customer or the order, and wherein the digital content displays the sub-image of the menu page in the shifted position when the digital content is played back; and
storing the watermarked digital content onto at least one computer-readable storage medium after the order is placed.

16. The method of claim 15, wherein the obtaining information includes obtaining information specific to the order.

17. The method of claim 15, wherein the obtaining information includes obtaining personal information specific to the customer placing the order.

18. The method of claim 15, wherein the associating of the watermark includes generating a unique identifier to be used as the watermark, and further comprising associating the unique identifier with the customer placing the order.

19. A computer-implemented method comprising:
under control of one or more computer systems containing memory and configured with executable instructions stored in the memory,
trimming one or more portions of digital video content stored in the memory to uniquely identify an order for the digital video content or a user that placed the order, wherein the digital video content comprises multiple defined portions and is uniquely identified by trimming at least one or more portions before or after one of the multiple defined portions of the digital video content stored in the memory;
associating the trimmed digital video content with the order or the user; and
storing the trimmed digital video content onto at least one computer-readable storage medium after the order is placed.

20. A method as recited in claim 19, wherein the digital video content includes a plurality of video frames, and wherein the trimming of the portion of the digital video content comprises removing a determined number of the video frames from the digital video content.

21. A computer-implemented method comprising:
under control of one or more computer systems containing memory and configured with executable instructions stored in the memory,
receiving digital video content and storing the digital video content in the memory, the digital video content having a menu sub-image in a first position;
shifting the menu sub-image of the digital video content stored in the memory to a second, different position to uniquely identify an order for the digital video content or a user that placed the order, wherein the order or the user is uniquely identified based at least in part on how the menu sub-image of the digital video content stored in the memory is shifted;

associating the digital video content stored in the memory having the menu sub-image in the second position with the order or the user; and storing the digital video content having the menu sub-image in the second position onto at least one computer-readable storage medium after the order is placed such that the menu sub-image is rendered in the second position when the digital video content is played back.

22. The method of claim 1, wherein the watermark is also created based at least in part on how many video frames of the multiple video frames of the digital content are trimmed.

23. The system of claim 5, wherein the watermark is also created based at least in part on which video frames of the multiple video frames of the digital content are trimmed.

24. A watermark embedding system comprising:

one or more processors;

memory;

a webserver stored in the memory and executable on the one or more processors to interact with at least one customer via a browser to obtain information related to at least one order for at least one title of digital content stored in the memory, the digital content comprising multiple frames and multiple defined portions;

a duplication system stored in the memory and executable on the one or more processors to access the order information, to embed at least one watermark onto the digital content stored in the memory after the order is placed, and to encode the watermarked digital content onto at least one computer-readable storage medium; and wherein the duplication system includes a component for embedding at least one watermark by trimming one or more frames of the multiple frames of the digital content, wherein the watermark is created by trimming at least one or more frames before or after the one of the multiple defined portions of the digital content, and wherein the duplication system includes a component for embedding at least one watermark by altering at least one sub-image by shifting a position of the sub-image to uniquely represent the watermark associated with the customer or the order.

* * * * *